(12) United States Patent
Snyder, Sr. et al.

(10) Patent No.: US 6,993,848 B2
(45) Date of Patent: Feb. 7, 2006

(54) PIPE PREPARATION DEVICE

(75) Inventors: Ronald R. Snyder, Sr., Schnecksville, PA (US); Douglas R. Dole, Whitehouse Station, NJ (US)

(73) Assignee: Victaulic Company, Easton, PA (US)

( * ) Notice: Subject to any disclaimer, the term of this patent is extended or adjusted under 35 U.S.C. 154(b) by 0 days.

(21) Appl. No.: 10/849,746

(22) Filed: May 19, 2004

(65) Prior Publication Data
US 2005/0257388 A1 Nov. 24, 2005

(51) Int. Cl.
B23B 3/22 (2006.01)

(52) U.S. Cl. .......................... 33/21.3; 82/113; 408/187
(58) Field of Classification Search ................ 33/21.2, 33/21.3; 82/113, 123; 408/187
See application file for complete search history.

(56) References Cited

U.S. PATENT DOCUMENTS

| | | | |
|---|---|---|---|
| 1,662,936 A | 3/1928 | Philipp | |
| 2,470,392 A | 5/1949 | Gassmann | 77/73 |
| 2,985,963 A * | 5/1961 | Lee | 33/21.3 |
| 3,044,757 A * | 7/1962 | Steele | 33/21.3 |
| 3,137,208 A | 6/1964 | Andler | 90/12 |
| 3,232,145 A | 2/1966 | Wilson | 77/73 |
| 3,546,988 A * | 12/1970 | Behnke | 82/113 |
| 3,595,107 A | 7/1971 | Dackow | 82/4 C |
| 3,661,472 A | 5/1972 | Beauloye | |
| 3,807,369 A | 4/1974 | Bjalme | |
| 3,856,283 A * | 12/1974 | Johnson | 33/21.3 |
| 4,220,060 A | 9/1980 | Bjödstrup | |
| 4,229,129 A | 10/1980 | Schaenzer | |
| 4,532,837 A * | 8/1985 | Cushenbery et al. | 82/113 |
| 4,586,408 A | 5/1986 | Goldner | |
| 4,678,380 A | 7/1987 | Zahuranec et al. | 408/211 |
| 5,020,221 A | 6/1991 | Nelson | |
| 5,020,401 A * | 6/1991 | Jiles | 82/113 |
| 5,076,122 A | 12/1991 | Katzenburger et al. | 82/113 |
| 5,180,260 A | 1/1993 | Phillips, Sr. | 408/211 |
| 5,716,171 A | 2/1998 | Malott et al. | 408/187 |
| 5,853,272 A | 12/1998 | Wartluft et al. | 408/199 |
| 6,698,321 B2 * | 3/2004 | Oswald | 82/113 |
| 6,709,206 B1 | 3/2004 | Andes et al. | 408/211 |
| 2001/0001935 A1 | 5/2001 | Wilk, Jr. et al. | 82/113 |
| 2002/0094247 A1 | 7/2002 | Wartluft et al. | 408/82 |
| 2003/0113176 A1 | 6/2003 | Kress | 408/146 |
| 2004/0226423 A1 | 11/2004 | Oswald | 83/165 |

FOREIGN PATENT DOCUMENTS

| | | |
|---|---|---|
| GB | 2 384 453 | 7/2003 |
| GB | 2 390 051 | 12/2003 |
| WO | WO04/016393 | 2/2004 |

* cited by examiner

Primary Examiner—Christopher W. Fulton
(74) Attorney, Agent, or Firm—Synnestvedt & Lechner LLP

(57) ABSTRACT

A pipe preparation device is disclosed for chamfering pipe ends and placing witness marks thereon to provide a visible indication that the pipes are properly engaged with a coupling. The device includes a body having co-axially aligned receptacles at opposite ends, the receptacles being sized to receive pipes having different diameters from one another. Cutting blades are mounted on the body and project into each receptacle. The blades have cutting edges that engage the end of a pipe inserted into a receptacle and cut a chamfer when the body is rotated relatively to the pipe. Two scoring tools project into each receptacle. The tools have contact surfaces that engage a pipe inserted into the receptacle. The tools in each receptacle are offset from one another and form two circumferential grooves around the pipe when the body and pipe are rotated relatively to each other. The grooves act as witness marks.

26 Claims, 7 Drawing Sheets

PIPE PREPARATION DEVICE

FIELD OF THE INVENTION

This invention concerns tools for preparing pipes for joining to one another, and especially for pipes joined using mechanical pipe couplings.

BACKGROUND OF THE INVENTION

Pipes, especially relatively small diameter copper pipes between one half inch and two inches nominal diameter, are used extensively to provide water service for homes, business and industry. Such pipes may be sealingly joined to one another end to end using mechanical couplings to create a piping network for conveying water throughout a building such as a home, office or factory.

Mechanical couplings provide various advantages over traditional solder joints for connecting pipes in that they avoid the use of acid flux, solder and open flame to effect a connection. Assembly of a joint using a mechanical coupling also requires less time than a solder joint and may be performed by a less skilled worker. Assembly of a joint merely requires that a pipe end be inserted into a coupling so that the coupling and pipe end engage properly.

The mechanical coupling, which may be a fitting such as an elbow, tee or straight fitting, for example, includes a housing having a socket coaxially aligned with a receptacle for receiving the pipe end. A sealing member, such as an O-ring or a pressure responsive seal and a retainer are captured within the receptacle adjacent to the socket. The retainer may have a plurality of flexible teeth that extend around the circumference of the receptacle. The teeth project radially inwardly and are angularly oriented toward the socket. When the pipe end is inserted through the receptacle and into the socket, the teeth engage the pipe's outer surface and retain it within the coupling. Due to their angular orientation, the teeth are "self jamming" and resist motion of the pipe that would tend to force it from the receptacle. The sealing member within the receptacle engages the pipe and the housing to provide a fluid-tight seal, and the socket supports the pipe and provides bending stiffness to the joint, preventing angular deflection between the pipe and the coupling.

To ensure an effective, fluid-tight joint, the pipe end must be properly seated within the coupling so that it engages the socket over a sufficient length to insure that the full stiffness of the joint is achieved and so that the sealing member and the pipe outer surface engage and seal relatively to one another. Furthermore, the teeth of the retainer must engage the pipe end to ensure that it is retained within the coupling against the fluid pressure it will eventually see. However, without a visible means to indicate proper engagement of the pipe end with the mechanical coupling it is difficult to be sure that the joint formed will be fluid tight and sufficiently inserted to maximize bending stiffness and strength of the joint. Visible indicators may take the form of "witness marks", typically circumferential grooves or other visible markings that extend around the pipe in spaced relation to the end. The witness mark is positioned, for example, such that if it is not positioned visible and flush next to the coupling, then the pipe end is not properly engaged with the coupling and must be further inserted until the witness mark is visibly flush with the coupling. It is advantageous to provide a device that will prepare pipe ends for joining with mechanical couplings, for example, by forming one or more witness marks in proper spaced relation to an end of a pipe for a particular coupling and diameter pipe.

SUMMARY OF THE INVENTION

The invention concerns a device for preparing ends of pipes for joining the pipes to one another end to end, preferably although not exclusively using mechanical couplings. The device comprises a body having a receptacle therein sized to receive the end of one of the pipes. One or more tools are mounted on the body and are positioned so as to engage the pipe upon insertion of the pipe within the receptacle. The tools may comprise, for example, a marking tool mounted on the body. The marking tool has a contact surface engageable with the pipe for creating a witness mark, for example, a circumferential groove around the pipe upon rotation of the body and the pipe relatively to one another. A second marking tool may also be mounted on the body. The second marking tool is preferably offset from the first marking tool in a direction lengthwise along the pipe. The second marking tool has a second contact surface positioned so as to engage the pipe upon insertion of the pipe within the receptacle. Together, the first and second marking tools create first and second witness marks on the pipe upon rotation of the body and the pipe relatively to one another.

In addition to or instead of the marking tools, a cutting blade may be mounted on the body. The cutting blade has a cutting edge that extends into the receptacle and is positioned to engage the end of the pipe received therein. The cutting edge is oriented relatively to the pipe so as to create a chamfer on its end upon rotation of the body and the pipe relatively to one another.

The device may also include additional receptacles positioned within the body. The additional receptacles are sized to receive the end of one of the pipes and also have one or more tools mounted and positioned so as to engage the pipe upon its insertion within the additional receptacles. The tools associated with the receptacles may also be marking tools and cutting blades substantially as described above for the first receptacle. Preferably, when two receptacles are present, the first and second receptacles are substantially coaxially aligned with one another and are sized to receive pipes of different diameters. Furthermore, an elongated shaft may be mounted on the body. Preferably, such a shaft has a polygonal cross-section (preferably hexagonal). When mounted, the shaft is oriented substantially coaxially with the receptacles and is engageable with a chuck or a compatible extension shaft such as used with a rachet wrench, power drill or other powered device. The presence of the shaft allows the body to be rotated relatively to the pipe upon rotation of the shaft by the drill or other powered device. Preferably, the shaft extends substantially coaxially through both the first and the second receptacles allowing the body to be turned from either end.

The device may also accommodate a separate marking tool for placing a witness mark on ends of pipes. The device preferably comprises a body having a receptacle therein sized to receive the end of one of the pipes, and an aperture extending through the body and into the receptacle. The aperture is adapted to receive the marking tool, which could be a writing implement such as a pen, pencil or marker or a stylus with a hardened tip for scoring the pipe surface. The marking tool is insertable through the aperture and into the receptacle for the pipe end received therein. The marking tool is adapted to create a witness mark on the pipe upon rotation of the body and the pipe relatively to one another.

BRIEF DESCRIPTION OF THE DRAWINGS

FIG. 1A is a perspective view of pipe ends prepared using the device of FIG. 1;

DETAILED DESCRIPTION OF THE EMBODIMENTS

Figure 1:
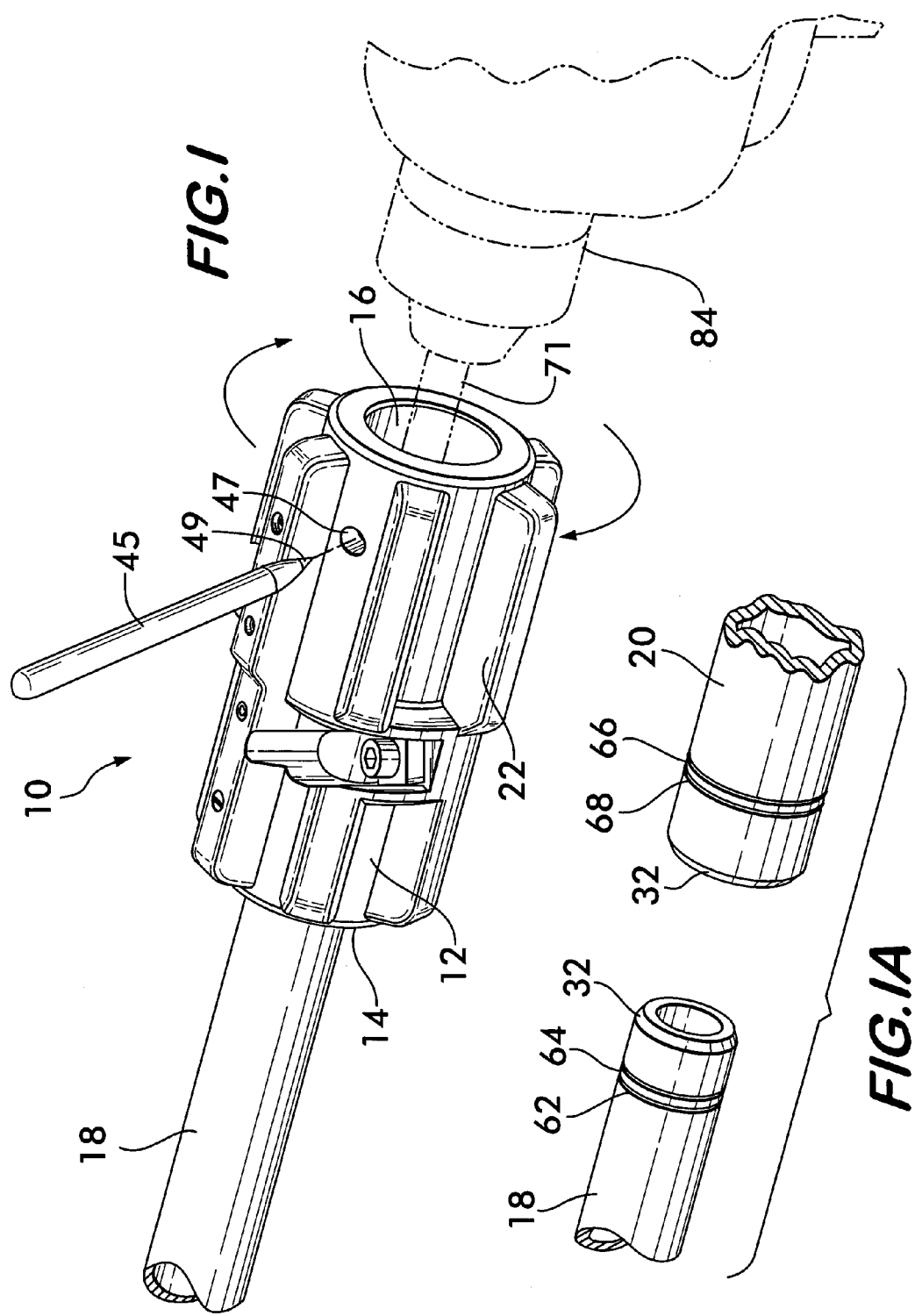
FIG. 1 is a perspective view of a pipe preparation device according to the invention.

FIG. 1 shows pipe preparation device 10 according to the invention. Device 10 comprises a body 12 having receptacles 14 and 16 at opposite ends. Preferably, receptacles 14 and 16 are coaxially aligned with one another and are sized to receive pipes 18 and 20, shown in FIG. 1A, the pipes preferably having different diameters from one another. As body 12 must be turned relatively to the pipes 18 and 20 to effect their preparation, it is convenient to provide radially projecting ribs 22 to facilitate manual grasping and rotating of the device 10. Body 12 is preferably formed from durable polymer resin to provide a light-weight, inexpensive and robust item that can withstand rough use.

Figure 2:
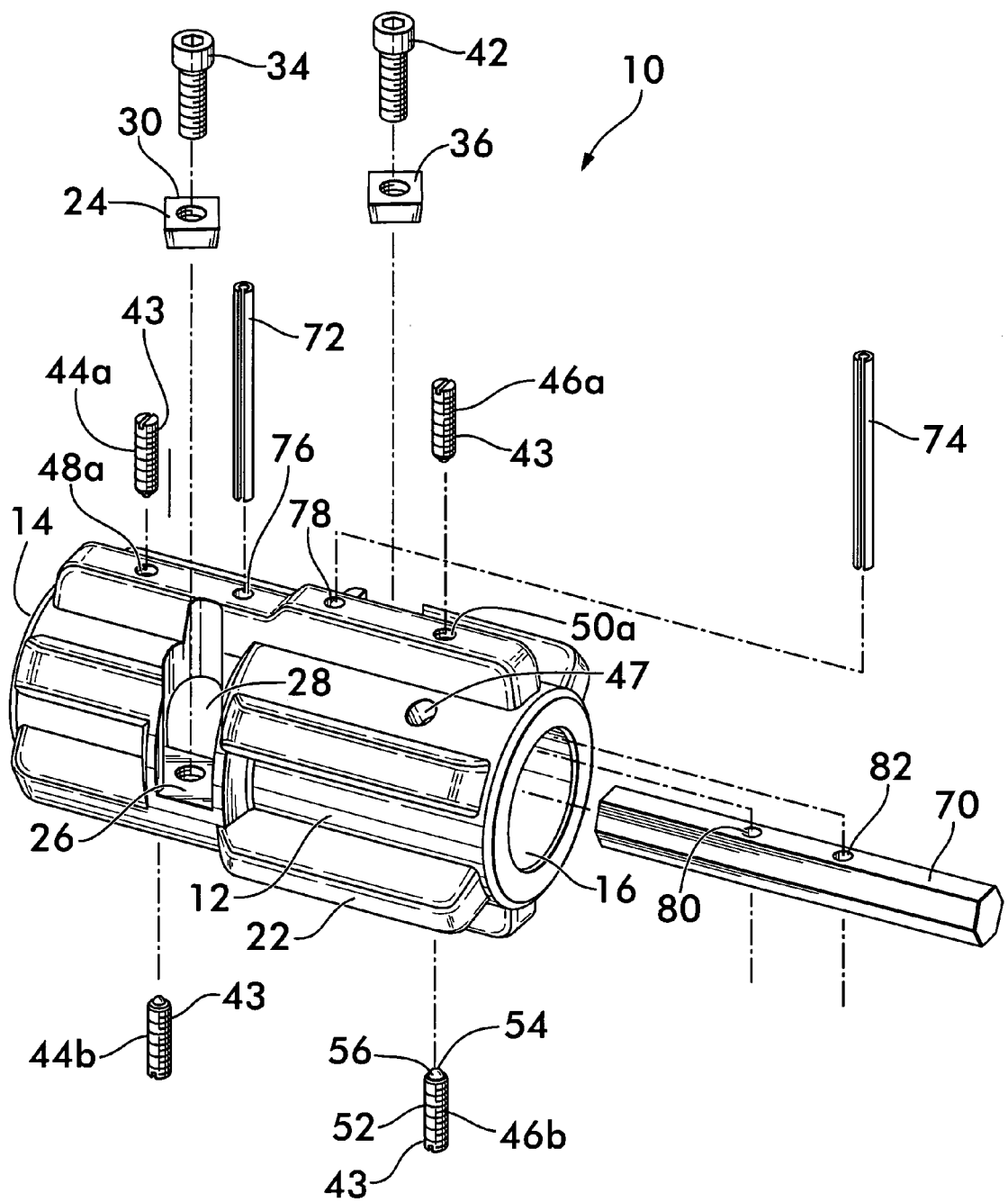
FIG. 2 is an exploded perspective view of the pipe preparation device.
Figure 3:
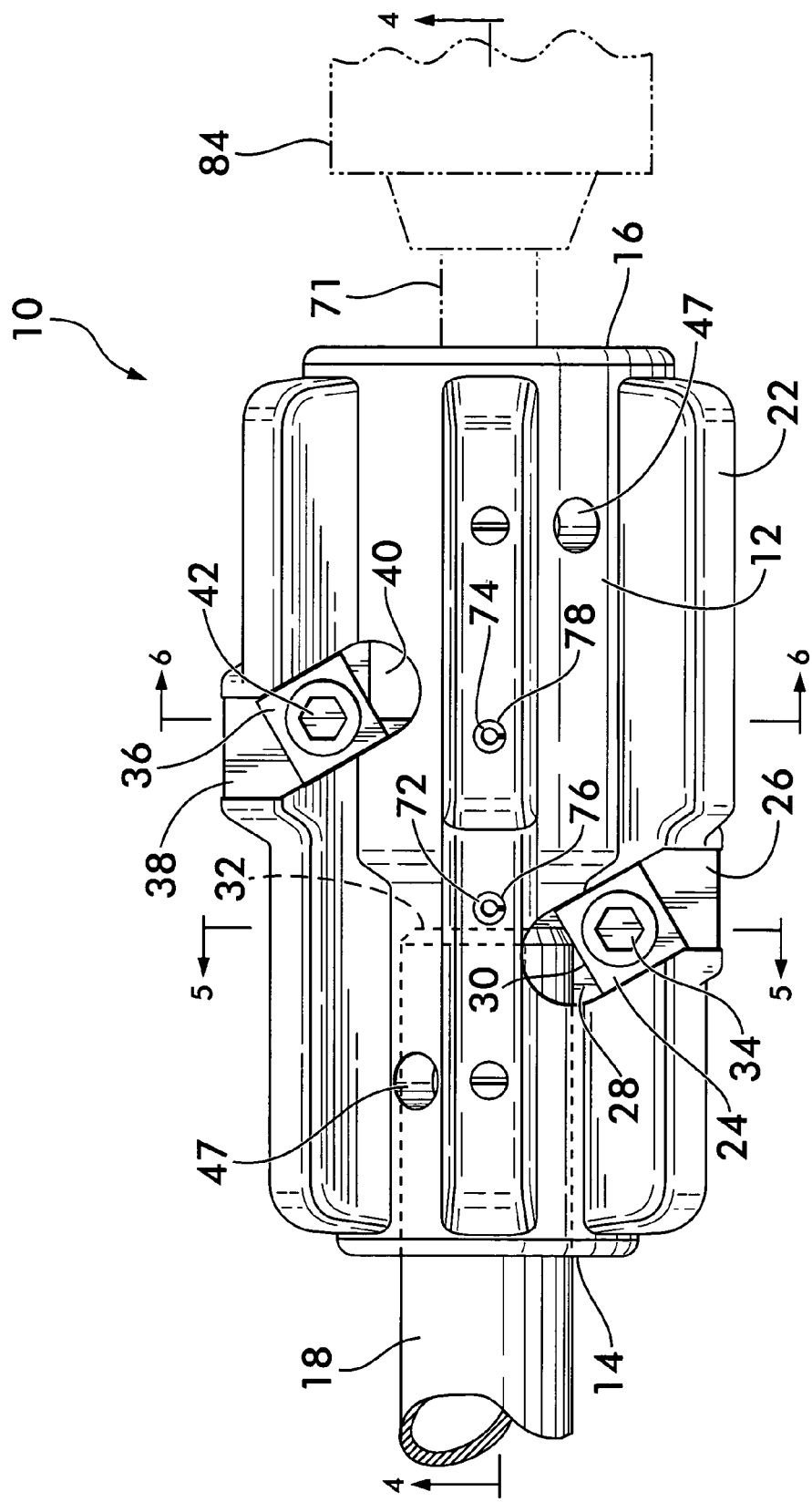
FIG. 3 is a plan view of the pipe preparation device.
Figure 5:
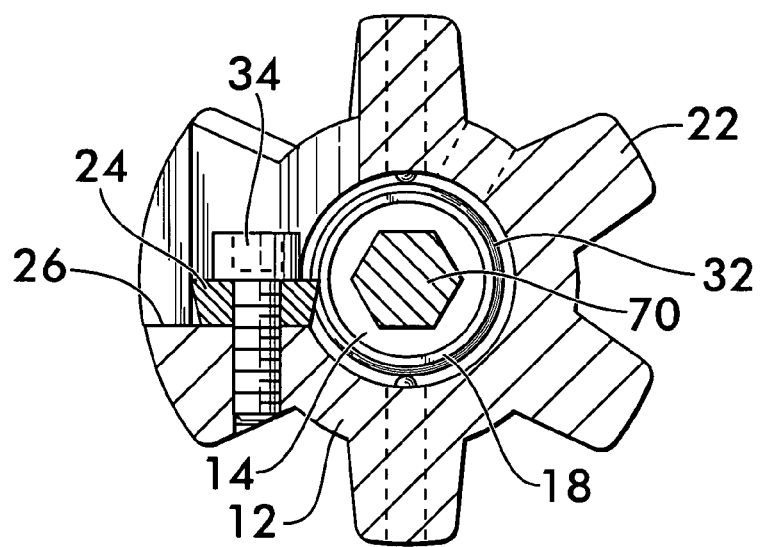
FIG. 5 is a cross-sectional view taken at line 5—5 of FIG. 3.
Figure 6:
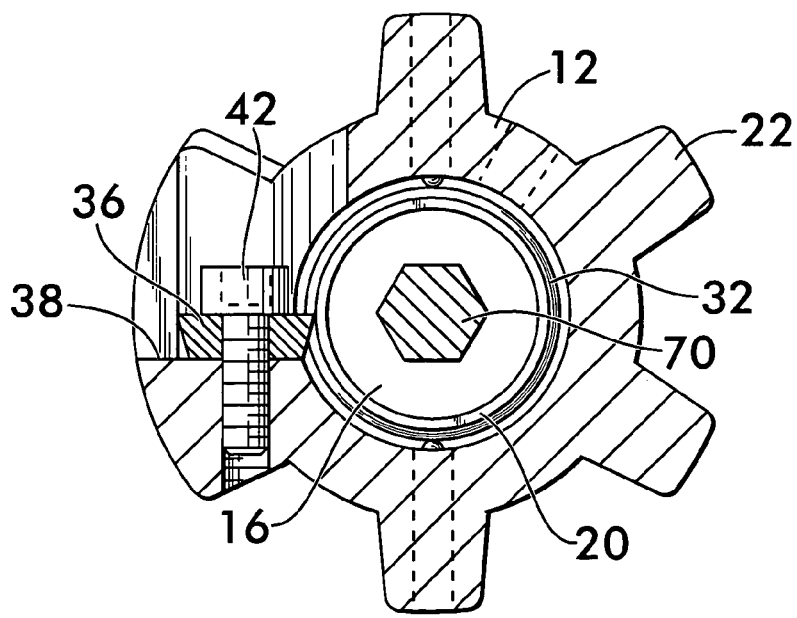
FIG. 6 is a cross-sectional view taken at line 6—6 of FIG. 3.

FIG. 2 provides an exploded view that illustrates the various tools mounted on the body 12 that engage the pipe during its preparation. A cutting blade 24 is mounted on a ledge 26 formed adjacent to an aperture 28 that opens into receptacle 14. As best shown in FIG. 3, the blade 24 has a cutting edge 30 that extends into the receptacle 14 to engage the end of pipe 18 inserted into the receptacle. Cutting edge 30 is oriented or shaped so that it cuts a chamfer 32 on the end of pipe 18 when the pipe and body are rotated relatively to one another. It is also contemplated that the cutting edge 30 may be used so as to form a radius or other shape on the pipe end. Shavings from the pipe are discharged from aperture 28. Chamfering the pipe end removes burrs or other irregularities caused by cutting of the pipe stock and also provides a lead-in that facilitates insertion of the pipe end into a coupling. Chamfering reduces insertion force required to deflect typical retainers and seals and also prevents or reduces the potential for damage to the seals. To ensure a proper chamfer, the cutting edge 30 is positioned so as to engage the pipe 18 at its center line as illustrated in FIG. 5. Preferably, the cutting blade 24 is removably mounted on ledge 26 using a fastener 34, allowing the blade to be readily replaced when it becomes dull. Preferably, cutting blade 24 has multiple cutting edges 30. This feature permits another cutting edge 30 to be indexed into the cutting position extending through aperture 28 as one edge becomes dull without replacing the blade 24, the blade merely being removed, rotated and secured back into position using fastener 34. As shown in FIGS. 3 and 6, a second cutting blade 36 is positioned on a second ledge 38 positioned adjacent to a second aperture 40 that opens into the other receptacle 16. The second cutting blade 36 forms a chamfer 32 on pipe 20 (see FIG. 1A) when this pipe is engaged within receptacle 16. Again, the cutting blade 36 is removably mounted using a fastener 42 and positioned to engage a pipe inserted into receptacle 16 along the pipe center line.

Figure 4:
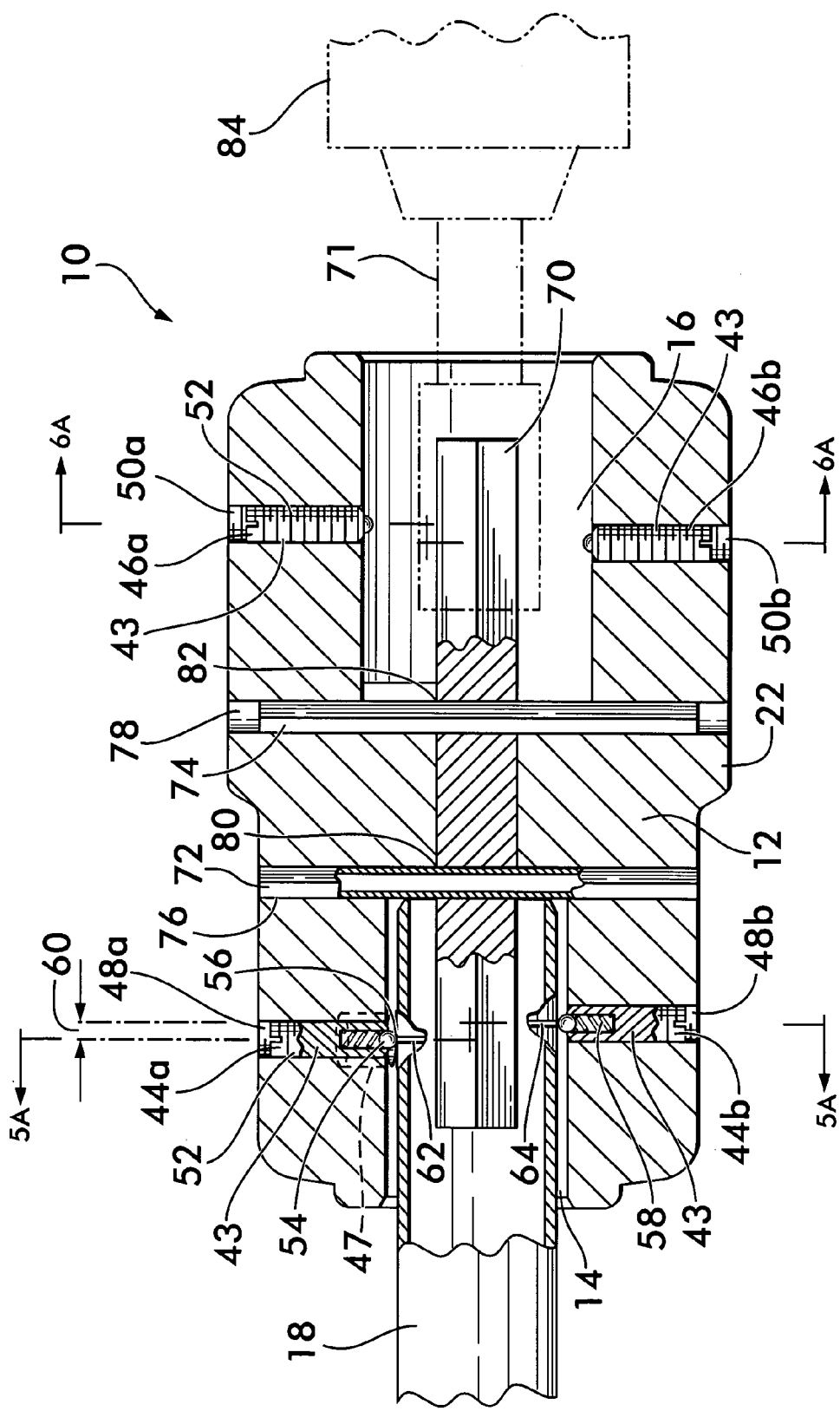
FIG. 4 is a longitudinal sectional view taken at line 4—4 of FIG. 3.

As further shown in FIG. 2, a plurality of marking tools 43 are mounted on the body 12. Marking tools 43 are adapted to form witness marks on the pipes and preferably take the form of scoring tools 44a, 44b, 46a and 46b. Each scoring tool is received within a respective opening 48a, 48b, 50a and 50b, the openings extending into one of the two receptacles 14 and 16 as shown in FIG. 4 to position two scoring tools within each receptacle. Preferably, each scoring tool includes a threaded cylinder 52, the openings 48a, 48b, 50a and 50b being tapped with compatible threads to allow the scoring tools to be removed and replaced.

Each scoring tool has a contact surface 54 preferably comprising the surface of a ball 56 that is positioned at the end of each cylinder 52. Springs 58 within each cylinder 52 bias balls 56 so that they project outwardly from each cylinder and into the receptacle in which the scoring tool is mounted. Preferably, the balls are captured within the cylinders, for example by staking.

As best illustrated for receptacle 14 in FIG. 4, the scoring tools 44a and 44b are offset from one another by a distance 60 in a direction lengthwise along pipe 18. Thus, when the pipe 18 is inserted within receptacle 14, and the body 12 and pipe 18 are rotated in opposite directions relatively to one another, the balls 56 in each scoring tool 44a and 44b engage the pipe 18 and form circumferential grooves 62 and 64 (see also FIG. 1A). The grooves are offset from one another as determined by the offset distance 60. Scoring tools 46a and 46b in receptacle 16 are also offset and will form offset grooves 66 and 68 around pipe 20 as shown in FIG. 1A when it is engaged within receptacle 16. Balls 56 are preferably made of stainless steel to prevent corrosion and may be hardened as required so that they effectively cold-work the pipe material to form the grooves.

Figure 5A:
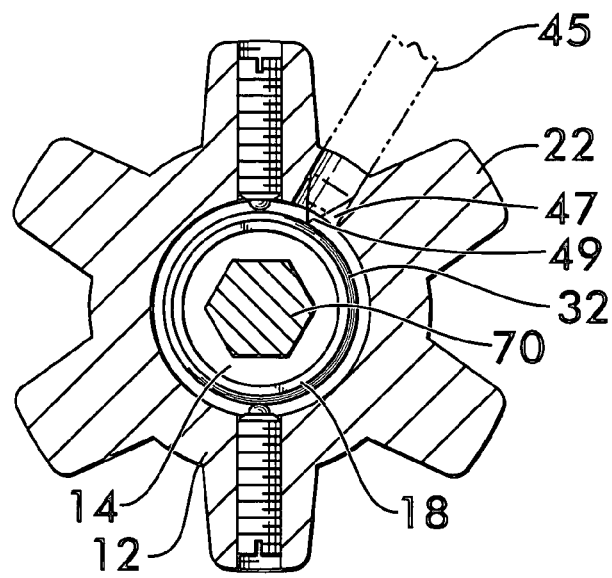
FIG. 5A is a cross-sectional view taken at line 5A—5A of FIG. 4.
Figure 6A:
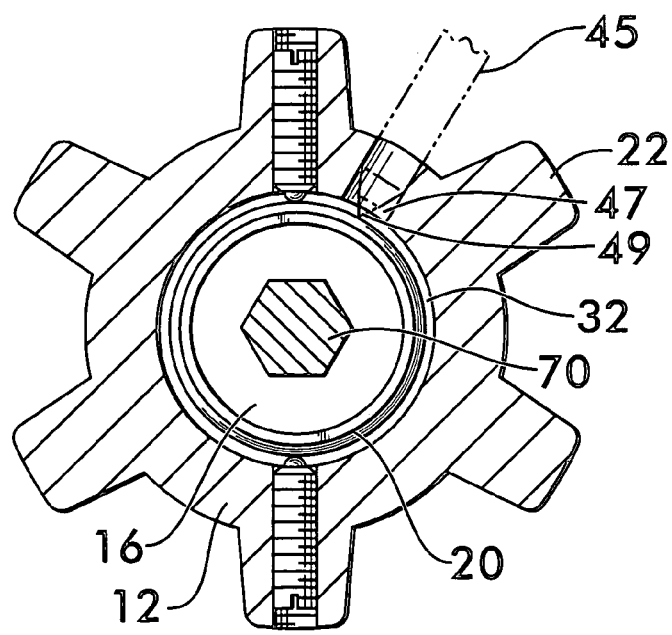
FIG. 6A is a cross-sectional view taken at line 6A—6A of FIG. 4.

FIGS. 1, 5A and 6A illustrate an alternate marking tool 45 that is not mounted on the body 12. Instead, body 12 has an aperture 47 adapted to receive marking tool 45, the tool being insertable through the aperture and into the receptacle 16. Upon insertion, as shown in FIG. 5A or 6A, marking tool 45 is engageable with a pipe 32 and will form a witness mark on the pipe when the pipe and the body are rotated relatively to one another.

The marking tool 45 may comprise, for example, a writing implement, such as a pen, a pencil, a marker or other item that will place a line or other indicia on the surface of the pipe 32. Tool 45 may also comprise a stylus with a tip 49 adapted to score the surface of the pipe 32 and form a circumferential groove therein. The tip may be, for example, a diamond, a hardened ball, a blade, or other item that will score the surface of the pipe to form a groove. As shown in FIGS. 5A and 6A, apertures 47 may be positioned in each end of body 12 so that each receptacle 14 and 16 may be used with a marking tool 45 to form witness marks.

Figure 7:
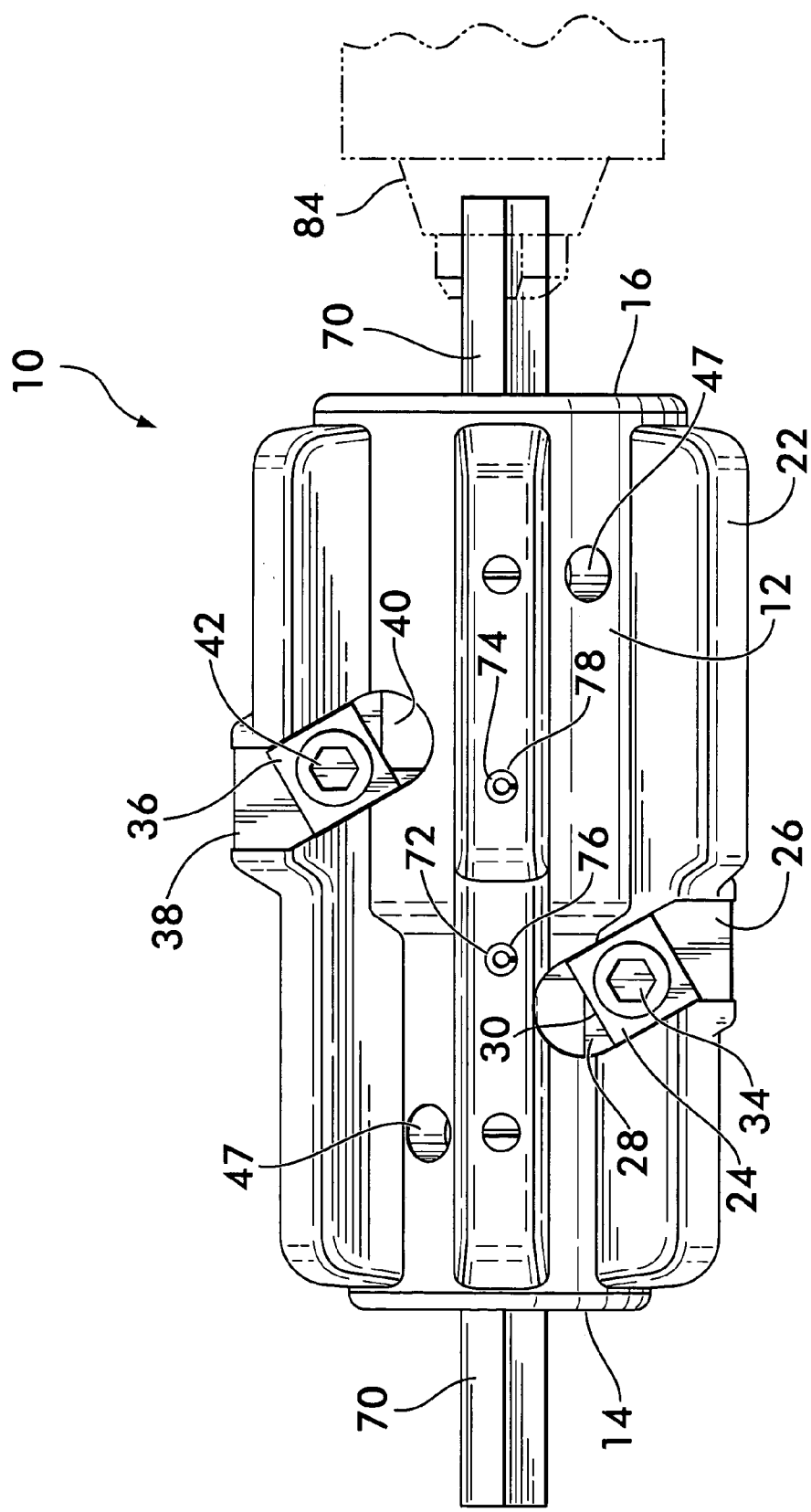
FIG. 7 is a plan view of an alternate embodiment of the pipe preparation device according to the invention.

As shown in FIGS. 2 and 4, it is advantageous to position a shaft 70 coaxially within receptacles 14 and 16 to facilitate rotation of the body 12 when preparing pipes. Shaft 70 is held in position by metal split pins 72 and 74 that extend through holes 76 and 78 in body 12. Holes 76 and 78 align with holes 80 and 82 in the shaft 70 when the shaft is properly positioned within the body 12. As shown in FIG. 4, split pins 72 and 74 extend into receptacles 14 and 16 and act as stops that engage the pipes (as illustrated by pipe 14)

and prevent them from gouging the body 12 within the receptacles. Shaft 70 preferably projects into both receptacles 14 and 16 to allow a power drill 84 (shown in broken line) to be applied to either end of the device to spin the body 12 when preparing a pipe. Preferably, the shaft 70 has a polygonal cross sectional shape, such as a hexagon. The polygonal shape allows the shaft 70 to be engaged by an adapter 71 that can be turned by a drill 84 (see FIG. 4) or other tool such as a rachet wrench. Alternately, as shown in FIG. 7, shaft 70 may extend outwardly from one or both of the receptacles 14 and 16 of body 12 to directly engage the drill 84 or other tool that turns it.

As illustrated in FIG. 1A, pipes 18 and 20, having different diameters, may be prepared using device 10. Preferably, each of the pipes has two grooves that function as witness marks (62 and 64 for pipe 18, and 66 and 68 for pipe 20) that indicate when a pipe is properly engaged with a pipe coupling. When properly engaged, one of the grooves (64, 68) is not visible, it being positioned within the coupling, and the other groove (62, 66) is visible adjacent to the end of the coupling providing an indication that the pipe was marked. It is advantageous to be able to ascertain that the pipe was marked so that proper engagement of pipe and coupling can be visually verified. The chamfer 32 at the ends of the pipes provides a lead-in to facilitate entry of the pipe into the coupling.

The pipe preparation device according to the invention provides a versatile item useful for preparing pipes for engagement with mechanical pipe couplings, the device being usable on more than one diameter pipe.

What is claimed is:

1. A device for preparing ends of pipes for joining said pipes to one another end to end, said device comprising:
   a body having a first receptacle therein sized to receive the end of one of said pipes;
   a first marking tool mounted on said body, said first marking tool having a first contact surface positioned so as to engage said pipe upon insertion of said pipe within said first receptacle, said first contact surface being adapted to create a witness mark on said pipe upon rotation of said body and said pipe relatively to one another;
   a second receptacle positioned within said body, said second receptacle being sized to receive the end of one of said pipes; and
   a second marking tool mounted on said body, said second marking tool having a second contact surface positioned so as to engage said pipe upon insertion of said pipe within said second receptacle, said second contact surface being adapted to create a witness mark on said pipe upon rotation of said body and said pipe relatively to one another.

2. A device according to claim 1, wherein said first marking tool comprises a scoring tool adapted to create a circumferential groove around said pipe.

3. A device according to claim 2, wherein said scoring tool comprises a ball having a greater hardness than said pipe, said ball having a surface comprising said first contact surface.

4. A device according to claim 3, further comprising a biasing member positioned between said ball and said body, said biasing member biasing said ball into engagement with said pipe.

5. A device according to claim 1, wherein said first marking tool is mounted on said body such that said first contact surface projects into said first receptacle.

6. A device according to claim 1, further comprising a third marking tool mounted on said body, said third marking tool being offset from said first marking tool in a direction lengthwise along said pipe, said third marking tool having a third contact surface positioned so as to engage said pipe upon insertion of said pipe within said first receptacle, said third marking tool being adapted to create a witness mark on said pipe upon rotation of said body and said pipe relatively to one another.

7. A device according to claim 6, wherein said first and third marking tools are mounted on said body such that said first and third contact surfaces project into said first receptacle.

8. A device according to claim 6, wherein said first and third marking tools each comprise first and second scoring tools adapted to create first and second circumferential grooves around said pipe.

9. A device according to claim 1, wherein said first and second receptacles are substantially coaxially aligned.

10. A device according to claim 1, wherein said first receptacle is sized to receive one of said pipes having a first diameter and said second receptacle is sized to receive another of said pipes having a second diameter different from said first diameter.

11. A device according to claim 1, further comprising a cutting blade mounted on said body, said cutting blade having a cutting edge extending into said first receptacle and positioned to engage the end of said pipe received within said first receptacle, said cutting edge being oriented relatively to said pipe so as to create a chamfer on the end thereof upon rotation of said body and said pipe relatively to one another.

12. A device according to claim 1, further comprising an elongated shaft mounted on said body, said shaft being oriented substantially coaxially with said first receptacle, said body being rotatable upon rotation of said shaft.

13. A device according to claim 12, where said shaft has a polygonal cross-sectional shape.

14. A device according to claim 12, wherein said shaft extends outwardly from said first receptacle.

15. A device for preparing ends of pipes for joining said pipes to one another end to end, said device comprising:
   a body having a first receptacle therein sized to receive the end of one of said pipes;
   a first tool mounted on said body and positioned so as to engage said pipe upon insertion of said pipe within said first receptacle;
   a second receptacle positioned within said body, said second receptacle being sized to receive the end of one of said pipes;
   a second tool mounted on said body and positioned so as to engage said pipe upon insertion of said pipe within said second receptacle; and
   an elongated shaft mounted on said body, said shaft being oriented substantially coaxially with one of said receptacles, said body being rotatable relatively to said pipe upon rotation of said shaft.

16. A device according to claim 15, where said shaft has a polygonal cross-sectional shape.

17. A device according to claim 15, wherein said shaft extends outwardly from one of said receptacles.

18. A device according to claim 15, wherein said first tool comprises a marking tool mounted on said body, said marking tool having a contact surface engageable with said pipe and adapted to create a witness mark on said pipe upon rotation of said body and said pipe relatively to one another.

19. A device according to claim 18, wherein said marking tool comprises a scoring tool adapted to create a circumferential groove around said pipe.

20. A device according to claim 19, wherein said scoring tool comprises a ball having a greater hardness than said pipe, said ball having a surface comprising said first contact surface.

21. A device according to claim 15, wherein said first tool comprises a cutting blade mounted on said body, said cutting blade having a cutting edge extending into said first receptacle and positioned to engage the end of said pipe received therein, said cutting edge being oriented relatively to said pipe so as to create a chamfer on the end thereof upon rotation of said body and said pipe relatively to one another.

22. A device according to claim 15, wherein said first and second receptacles are substantially coaxially aligned.

23. A device according to claim 22, wherein said shaft extends substantially coaxially through both said first and said second receptacles.

24. A device according to claim 15, wherein said first receptacle is sized to receive one of said pipes having a first diameter and said second receptacle is sized to receive one of said pipes having a second diameter different from said first diameter.

25. A device according to claim 15, wherein said second tool comprises a scoring tool mounted on said body, said scoring tool having a contact surface creating a circumferential groove around said pipe received within said second receptacle upon rotation of said body and said pipe relatively to one another.

26. A device according to claim 15, wherein said second tool comprises a cutting blade mounted on said body, said cutting blade having a cutting edge extending into said second receptacle and positioned to engage the end of said pipe received therein, said cutting edge being oriented relatively to said pipe so as to create a chamfer on the end thereof upon rotation of said body and said pipe relatively to one another.

* * * * *